H. F. CRANDALL.
FISHING ROD SUPPORT.
APPLICATION FILED MAR. 16, 1917.
1,268,096.
Patented June 4, 1918.
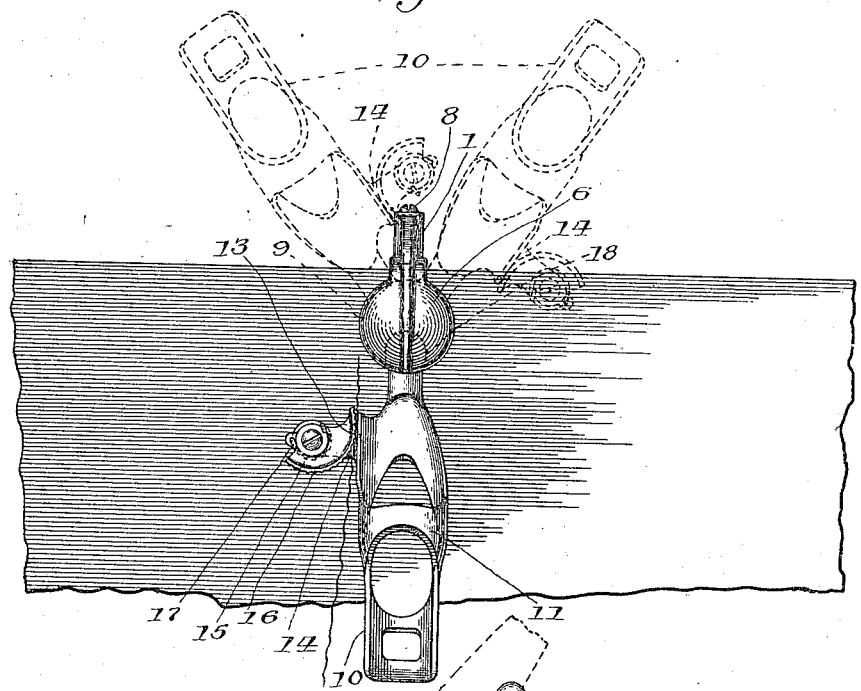
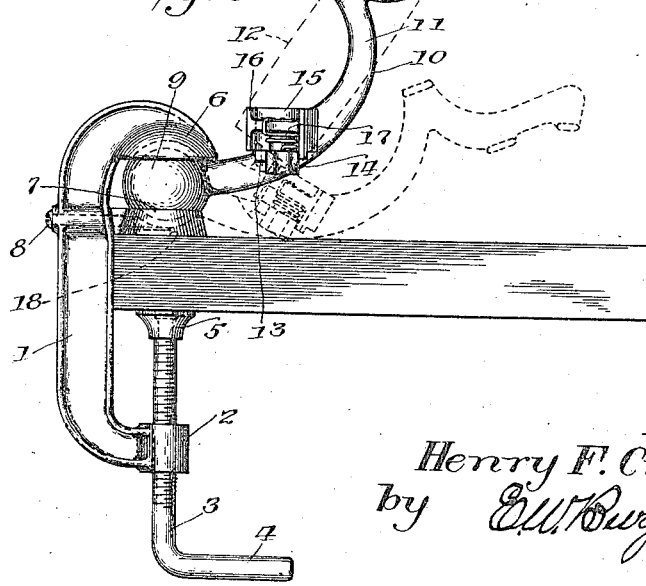
Inventor:
Henry F. Crandall,
by E. W. Burgess
Atty.

UNITED STATES PATENT OFFICE.

HENRY F. CRANDALL, OF RACINE, WISCONSIN.

FISHING-ROD SUPPORT.

1,268,096.  Specification of Letters Patent.  Patented June 4, 1918.

Application filed March 16, 1917. Serial No. 155,201.

*To all whom it may concern:*

Be it known that I, HENRY F. CRANDALL, a citizen of the United States, residing at Racine, in the county of Racine and State of Wisconsin, have invented certain new and useful Improvements in Fishing-Rod Supports, of which the following is a clear and exact specification.

My invention relates to fishing rod supports.

The objects of the invention are to provide a support of the class indicated that may be readily secured to the seat, gunwale, or other part of a boat, having means whereby the rod may be adjusted at any desired angle, upward or downward, or from side to side, relative to the securing means, and provided with an automatically operative line clamping mechanism adapted to releasably hold a line upon which fish may be strung.

I attain these objects by means of the mechanism illustrated in the accompanying drawing, in which—

Figure 1 is a top plan view of a rod support secured to the seat of a boat and embodying my invention; and Fig. 2 is a side elevation of Fig. 1.

The same reference characters designate like parts throughout the several views.

The mechanism includes a U-shaped supporting bracket member 1 provided with a threaded cylindrical portion 2 at one end thereof that operatively receives a clamping screw 3, preferably provided with a laterally turned hand piece 4 at its outer end whereby it may be manipulated, and having a self-alining thimble member 5 loosely mounted upon its opposite end. The opposite end of the bracket member 1 is provided with a fixed cup-shaped bearing portion 6, and 7 represents a complemental bearing member loosely connected with the body of the bracket, preferably by means of a screw 8 opposing the clamping screw 3 and adapted to coöperate with the fixed bearing 6 to receive a spherical member 9 between them, and thus forming a ball and socket joint. Integral with the ball 9 is an arm 10, carrying a rod receiving socket 11, adapted to receive a butt 12 of a fishing rod, as shown by dotted lines in Fig. 2 of the drawings.

The inner end of the rod receiving socket 11 is provided at one side thereof with a vertically and longitudinally disposed flange member 13 and a laterally extending arm 14 upon which is pivotally and eccentrically mounted a line clamping sector 15, provided with a peripheral vertically disposed corrugated flange member 16 adapted to coöperate with the flange 13 in a manner to secure the bait end of a line between them when pulled in one direction and to automatically release the line when it is pulled in an opposite direction or it may be used to secure a line upon which fish are strung. 17 represents a spring coiled about the axis of the sector 15, having one end thereof connected with the arm 14 and its opposite end with the sector 15 in a manner to yieldingly turn the sector in a clamping direction. The bearing member 7 is provided with a forwardly extending open gap 18, shown by dotted lines in Figs. 1 and 2, and adapted to receive the arm 10 in a manner permitting the rod receiving socket 11 to be folded closely against the bracket member 1 when the device is not in use.

In operation the device is secured to any desired part of a boat, as the edge of a seat or the gunwale, by means of the clamping screw 3 coöperating with the loosely mounted complemental bearing member 7, and simultaneously with the clamping action of the associated members the ball 9 is secured in any desired position of adjustment and the rod receiving socket 11 directed at any predetermined angle relative to the supporting bracket within the limits of the mechanism.

Having shown and described one embodiment of my invention, I do not desire that it be limited by the precise details of the structure as illustrated, it being understood that changes may be made in the form, proportion, and organization of the various parts of the mechanism without departing from the spirit of my invention as indicated in the appended claims.

What I claim as my invention and desire to secure by Letters Patent is:

1. In a device of the class indicated, in combination, a supporting bracket, a rod receiving socket, a connection between said bracket and said socket and means carried by one end of said bracket for simultaneously clamping said bracket to a support and said socket to said bracket.

2. In a device of the class described, in combination, a supporting bracket, a rod receiving socket, a ball and socket connection between said bracket and said socket and means carried by one end of said bracket for clamping said bracket to a support and said socket to said bracket.

3. A fishing rod support including, in combination, a U-shaped bracket member, a clamping device carried by one end of said bracket and a bearing member by its opposite end, a coöperating bearing member loosely mounted upon said bracket and opposing said clamping device, and a rod carrying socket adjustably received between said bearing members.

4. A fishing rod support including, in combination, a U-shaped bracket member, a clamping device carried by one end of said bracket, the opposite end of said bracket being provided with a fixed cup-shaped bearing member, a movable cup-shaped bearing member mounted upon said bracket and opposing said clamping device, a rod carrying socket, and a spherical bearing member carried by said socket and adapted to be adjustably received between said cup-shaped bearing members.

5. A fishing rod support including, in combination, a U-shaped bracket member, a clamping device carried by one end of said bracket, the opposite end of said bracket being provided with a fixed bearing member, a movable bearing member mounted upon said bracket and opposing said clamping device, and a rod carrying socket adjustably received between said bearing members, said movable bearing member being provided with an open ended gap permitting said socket to be folded against said bracket.

6. A fishing rod support including, in combination, a clamping member having at one end a fixed member and at its opposite end an adjustable member, a socket member, and means disposed between said fixed member and said adjustable member for securing said clamping member to a support and said socket member to said clamping member.

HENRY F. CRANDALL.

Copies of this patent may be obtained for five cents each, by addressing the "Commissioner of Patents, Washington, D. C."